(12) United States Patent
Otani et al.

(10) Patent No.: US 8,526,578 B2
(45) Date of Patent: Sep. 3, 2013

(54) VOICE COMMUNICATION APPARATUS

(75) Inventors: Takeshi Otani, Kawasaki (JP); Taro Togawa, Kawasaki (JP); Yasuji Ota, Kawasaki (JP); Kaori Endo, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 13/435,077

(22) Filed: Mar. 30, 2012

(65) Prior Publication Data

US 2012/0189108 A1 Jul. 26, 2012

Related U.S. Application Data

(63) Continuation of application No. PCT/JP2009/067165, filed on Oct. 1, 2009.

(51) Int. Cl.
*H04M 1/64* (2006.01)

(52) U.S. Cl.
USPC ............... 379/88.08; 379/88.01; 379/205.01; 370/263; 348/484

(58) Field of Classification Search
USPC .......... 379/88.01–88.04, 88.08–88.1, 205.01, 379/206.01; 709/205; 348/480–484; 704/278; 370/263, 266, 267
See application file for complete search history.

(56) References Cited

U.S. PATENT DOCUMENTS

| 2001/0034601 A1 | 10/2001 | Chujo et al. | |
|---|---|---|---|
| 2002/0007396 A1 * | 1/2002 | Takakura et al. | 709/205 |
| 2006/0069572 A1 | 3/2006 | Komata | |
| 2006/0140379 A1 | 6/2006 | Yamamoto et al. | |
| 2007/0293189 A1 | 12/2007 | Shiroishi | |
| 2008/0172229 A1 | 7/2008 | Imai | |

FOREIGN PATENT DOCUMENTS

| JP | 2001-175300 | 6/2001 |
|---|---|---|
| JP | 2003-233387 | 8/2003 |
| JP | 2004-146894 | 5/2004 |
| JP | 2004-320596 | 11/2004 |
| JP | 2004-343443 | 12/2004 |
| JP | 2005-124062 | 5/2005 |
| JP | 2006-81051 | 3/2006 |
| JP | 2006-120018 | 5/2006 |
| JP | 2006-157474 | 6/2006 |
| JP | 2006-174198 | 6/2006 |
| JP | 2007-259427 | 10/2007 |

(Continued)

OTHER PUBLICATIONS

International Preliminary Report on Patentability mailed May 18, 2012 issued in corresponding International Patent Application No. PCT/JP2009/067165.

(Continued)

*Primary Examiner* — Md S Elahee
(74) *Attorney, Agent, or Firm* — Staas & Halsey LLP

(57) ABSTRACT

A voice communication apparatus includes an analysis unit to analyze an outgoing conversation signal transmitted from a user of the voice communication apparatus to another party in communication or an incoming conversation signal from the another party in communication received by the voice communication apparatus, a storage unit to store a voice message to be played back, a mixing unit to perform mixing of the voice message with the incoming conversation signal, and a control unit to control a start timing of the mixing so that the mixing of the voice message with the incoming conversation signal is started between utterances of the user on the basis of an analysis result of the analysis unit.

6 Claims, 12 Drawing Sheets

(56) References Cited

FOREIGN PATENT DOCUMENTS

| | | |
|---|---|---|
| JP | 2007-333603 | 12/2007 |
| JP | 2008-172579 | 7/2008 |
| WO | WO 00/46789 | 8/2000 |

OTHER PUBLICATIONS

International Search Report for PCT/JP2009/067165 mailed Dec. 28, 2009.

* cited by examiner

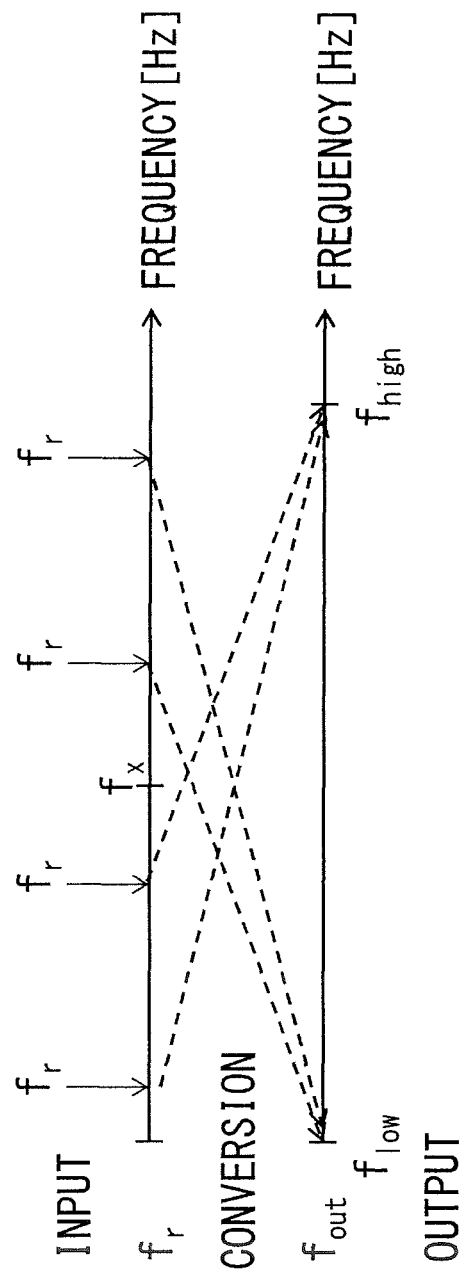

VOICE COMMUNICATION APPARATUS

CROSS-REFERENCE TO RELATED APPLICATIONS

This is a continuation of Application PCT/JP2009/067165, filed on Oct. 1, 2009, now pending, the entire contents of which are incorporated herein by reference.

FIELD

The embodiments discussed herein are related to a voice communication apparatus.

BACKGROUND

The highly advanced function and the highly advanced performance are realized in recent years for the electronic equipment having the voice communication function such as the mobile phone, PDA (Personal Digital Assistants), the personal computer (PC) and the like, in accordance with which the form of utilization of the electronic equipment as described above is progressively diversified. In such circumstances, if the electronic equipment has such a function that a message relevant to another party in communication is played back (reproduced) by the electronic equipment during talking on a phone while using the electronic equipment, it is possible to expect that the convenience of the electronic equipment will be improved.

For example, when a person A on telephone is talking on a phone with another party B in communication, if an announce of, for example, "tomorrow is the birthday of Mr. or Mrs. B" is played back as a message relevant to another party B in communication, then it is possible to widen the subject or topic of the conversation between the person A on telephone and another party B in communication. Conventionally, such a technique is known that a telephone apparatus is provided with storage means which stores a voice to be sent during talking on a phone, voice reading means which reads the voice stored in the storage means, and voice sending instruction input means, wherein the voice, which is read from the storage means, is sent simultaneously with a voice input into a microphone during talking on the phone, or while replacing the voice input into the microphone therewith (see, for example, Patent Document 1).

[Patent Document 1] Japanese Laid-Open Patent Publication No. 2004-320596
[Patent Document 2] Japanese Laid-Open Patent Publication No. 2006-174198
[Patent Document 3] Japanese Laid-Open Patent Publication No. 2006-81051

SUMMARY

According to one aspect of the embodiments, there is provided a voice communication apparatus. The voice communication apparatus includes an analysis unit to analyze an outgoing conversation signal transmitted from a user of the voice communication apparatus to another party in communication or an incoming conversation signal from the another party in communication received by the voice communication apparatus, a storage unit to store a voice message to be played back, a mixing unit to perform mixing of the voice message with the incoming conversation signal, and a control unit to control a start timing of the mixing so that the mixing of the voice message with the incoming conversation signal is started between utterances of the user on the basis of an analysis result of the analysis unit.

The object and advantages of the embodiments will be realized and attained by means of the elements and combinations particularly pointed out in the claims.

It is to be understood that both the foregoing general description and the following detailed description are exemplary and explanatory and are not restrictive of the embodiments, as claimed.

BRIEF DESCRIPTION OF DRAWINGS

FIG. 12 illustrates an explanatory diagram of a pitch conversion process.

DESCRIPTION OF EMBODIMENTS

In the case of the technique described in Patent Document 1, the message voice is mixed and played back irrelevant to the speaking situation of a user who uses the telephone apparatus. Therefore, it is feared that the message voice may be played back during the speaking of the user and it may be difficult for the user to utter. If the message voice is played back when the user speaks, there is such a possibility that the user is unable to properly hear the contents of the message.

A voice communication apparatus in the embodiments will hereinafter be described with reference to the drawings in a way that gives specific examples. The arrangements of the embodiments are exemplification, and the mode of the voice communication apparatus is not limited to the arrangements of the embodiments.

[First Embodiment]

Figure 1:
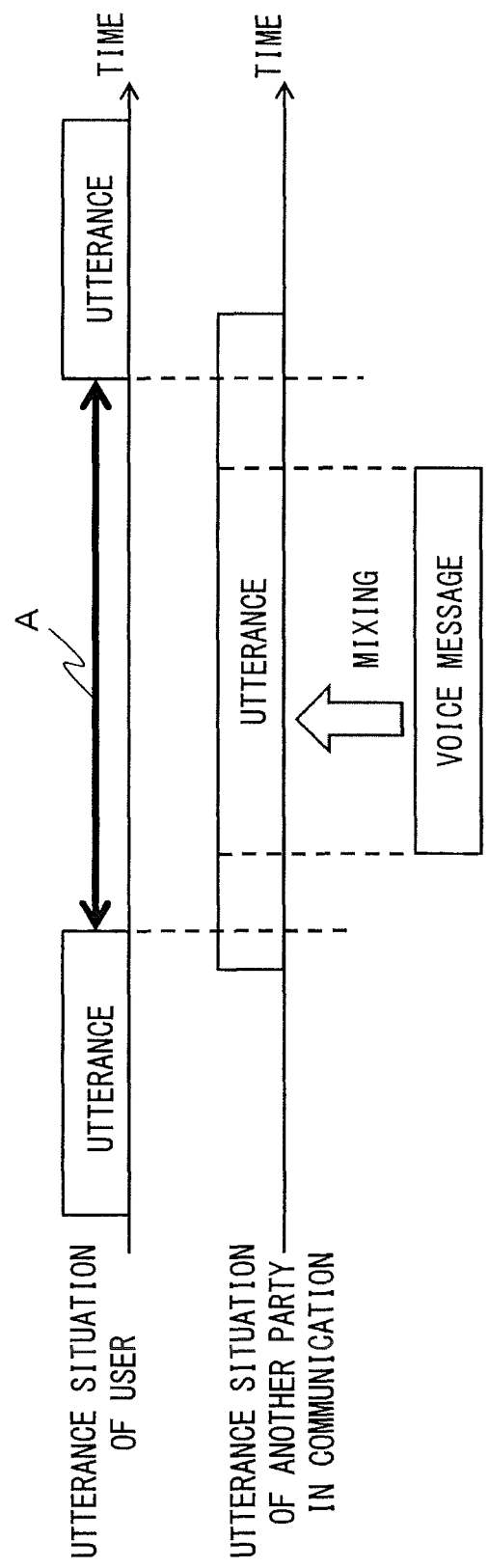
FIG. 1 illustrates an explanatory diagram of an objective of a voice communication apparatus in a first embodiment.
Figure 2:
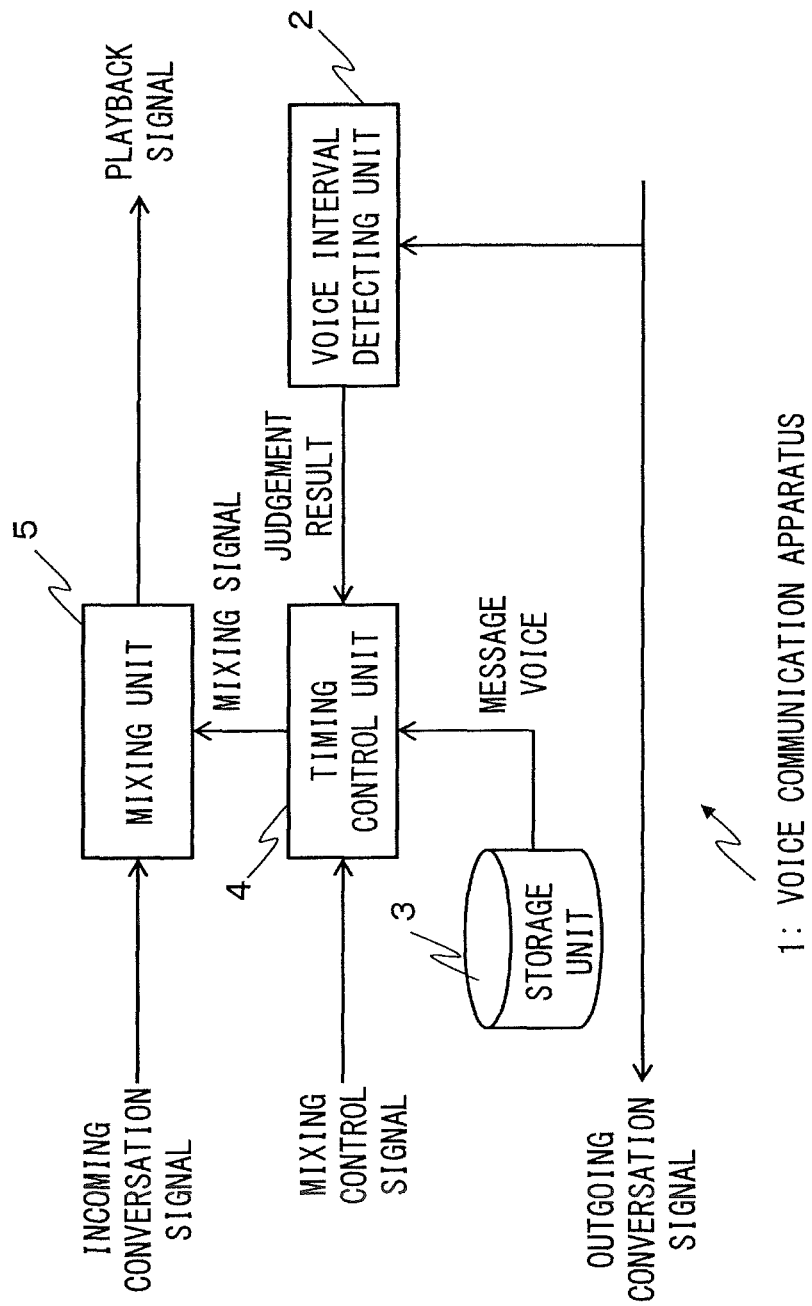
FIG. 2 illustrates a diagram illustrating an exemplary arrangement of the voice communication apparatus in the first embodiment.

FIG. 1 illustrates an explanatory diagram of the function aimed as an objective by a voice communication apparatus according to a first embodiment. FIG. 2 illustrates a diagram illustrating an exemplary arrangement of the voice communication apparatus 1 according to the first embodiment.

FIG. 1 illustrates an utterance situation between a user of the voice communication apparatus 1 and another party in communication. In the ordinary talking on a phone, the user and another party in communication alternately speak. Therefore, an interval A, in which the user does not speak, exists in the utterance situation of the user.

The voice communication apparatus 1 previously stores voice messages to be played back, an objective of which is to start the mixing in the interval A in which the user does not utter. For example, when the instruction is made to perform the mixing of the voice message in accordance with the operation performed by the user of the voice communication apparatus 1, the voice communication apparatus 1 monitors the outgoing conversation voice, i.e., the utterance situation of the user. After that, the voice communication apparatus 1 starts the mixing process if the silent interval, i.e., the interval in which the user does not utter is continued for equal to or more than a certain period of time.

The voice communication apparatus 1 illustrated in FIG. 2 includes a voice interval detecting unit 2 which is provided as the analysis unit, a message storage unit 3 which is provided as the storage unit, a timing control unit 4 which is provided as the control unit, and a mixing unit 5. The outgoing conversation signal, which is transmitted to another party in communication, is input into the voice interval detecting unit 2. The outgoing conversation signal can include the voice signal which is spoken by the user of the voice communication apparatus 1. The voice interval detecting unit 2 judges whether the outgoing conversation signal resides in the voice interval or the silent interval (including the non-voice interval), and gives the judgment result to the timing control unit 4. The judgment to judge whether the interval is the voice interval or the silent interval is performed, for example, for each of the frames (unit times).

The data of the voice message to be played back during the talking on the phone with another party in communication is stored in the message storage unit 3. The voice message can include every information in relation to another party in communication.

The timing control unit 4 controls the start timing of the voice message mixing executed by the mixing unit 5. The mixing control signal, which instructs the monitoring of the judgment result of the voice interval detecting unit 2, is input into the timing control unit 4. At the opportunity of the input of the mixing control signal, the timing control unit 4 monitors the silent interval by using the judgment result of the voice interval detecting unit 2. If the silent interval is continued for equal to or more than a certain period of time during the monitoring of the silent interval, i.e., if a predetermined number of the silent interval frames are continued, then the timing control unit 4 reads the voice message from the message storage unit 3, and gives the mixing signal including the voice message to the mixing unit 5.

The incoming conversation signal, i.e., the signal received from the side of another party in communication is input into the mixing unit 5. The mixing unit 5 starts the mixing process for mixing the voice message with the incoming conversation signal by using the trigger of the input of the mixing signal from the timing control unit 4. The mixing process result is output as the playback signal from the mixing unit 5. In this way, the mixing start timing depends on the input timing of the mixing signal brought about by the timing control unit 4.

The playback signal is output as the playback sound by the aid of an unillustrated playback device and a speaker, which is heard by the user. Accordingly, the user can hear or listen to the reproduced voice message in the interval in which the user himself/herself does not utter during the talking on the phone.

The voice interval detecting unit 2, the timing control unit 4, and the mixing unit 5 illustrated in FIG. 2 can be realized by using any exclusive or general purpose hardware. Alternatively, they can be realized as the functions obtained such that a processor such as a central processing unit (CPU), a digital signal processor (DSP) or the like executes the programs stored in a memory (semiconductor memory, hard disk HDD, or flash memory etc.). Further, the message storage unit 3 is prepared or formed in a storage area of a storage medium.

Figure 3:
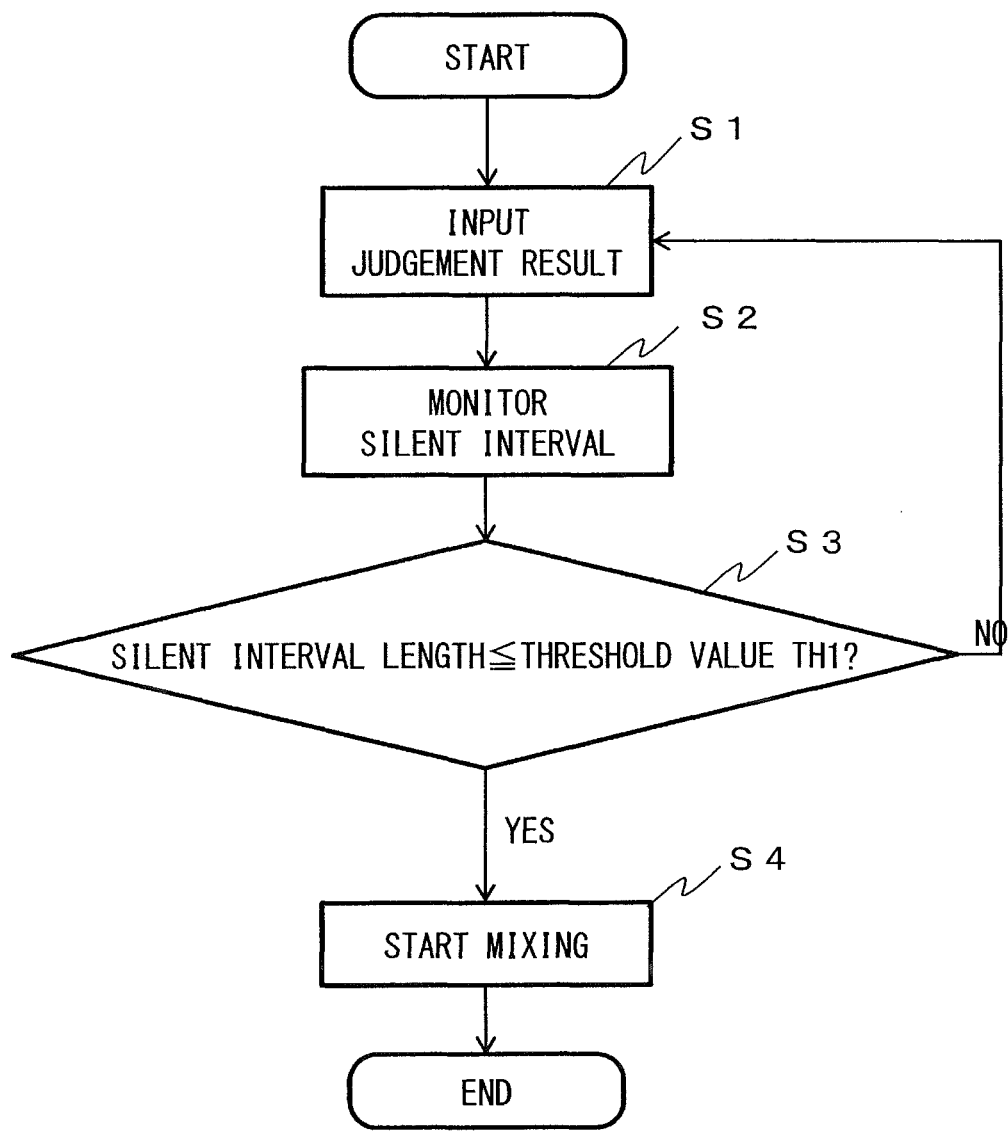
FIG. 3 illustrates a flow chart illustrating an exemplary process performed by a timing control unit in the first embodiment.

FIG. 3 illustrates a flow chart illustrating an exemplary process performed by the timing control unit 4 of the voice communication apparatus 1 in the first embodiment. The process illustrated in FIG. 3 is started at the opportunity of the control of the mixing control signal supplied to the timing control unit 4. The mixing control signal can be given to the timing control unit 4 by means of the operation of an unillustrated input device of the voice communication apparatus 1 performed by the user.

When the process is started, then the timing control unit 4 starts to accept the input of the judgment result of the voice interval/silent interval input from the voice interval detecting unit 2 (Step S1), and the timing control unit 4 starts the monitoring of the silent interval (Step S2).

If the silent interval length is equal to or more than a threshold value TH1 previously held by the timing control unit 4 (YES in Step S3), the timing control unit 4 starts the mixing (Step S4). The timing control unit 4 reads the voice message from the message storage unit 3, and the mixing signal including the voice message is given to the mixing unit 5. If the silent interval length is equal to or less than the threshold value TH1 (NO in S3), then the process is returned to Step S1, and the monitoring of the silent interval is continued.

If the process in Step S4 is completed, the timing control unit 4 completes the process. In this way, the monitoring of the silent interval and the control of the mixing timing are executed every time when the mixing control signal is input.

The voice interval detection process, which is performed by the voice interval detecting unit 2, may be started at the opportunity of the input of the mixing control signal. That is, it is also allowable that the operation of the voice interval detecting unit 2 cooperates with the operation of the timing control unit 4.

According to the first embodiment, if the silent interval is continued for equal to or more than the certain period of time, i.e., if the state, in which the user does not utter, is continued for the certain period of time, then the mixing of the voice message is started.

Accordingly, it is possible to play back the voice message in the non-utterance interval of the user (interval A, FIG. 1).

Therefore, the playback of the voice message is not started during the utterance of the user. Accordingly, it is possible to avoid such a situation that the user feels any difficulty to talk while worrying about the playback start timing of the voice message. Further, it is possible to prevent the voice message from being hardly heard due to the playback of the voice message during the utterance of the user.

[Second Embodiment]

Next, an example, in which the voice communication apparatus is applied to an internet protocol (IP) telephone, will be described as a second embodiment.

Figure 4:
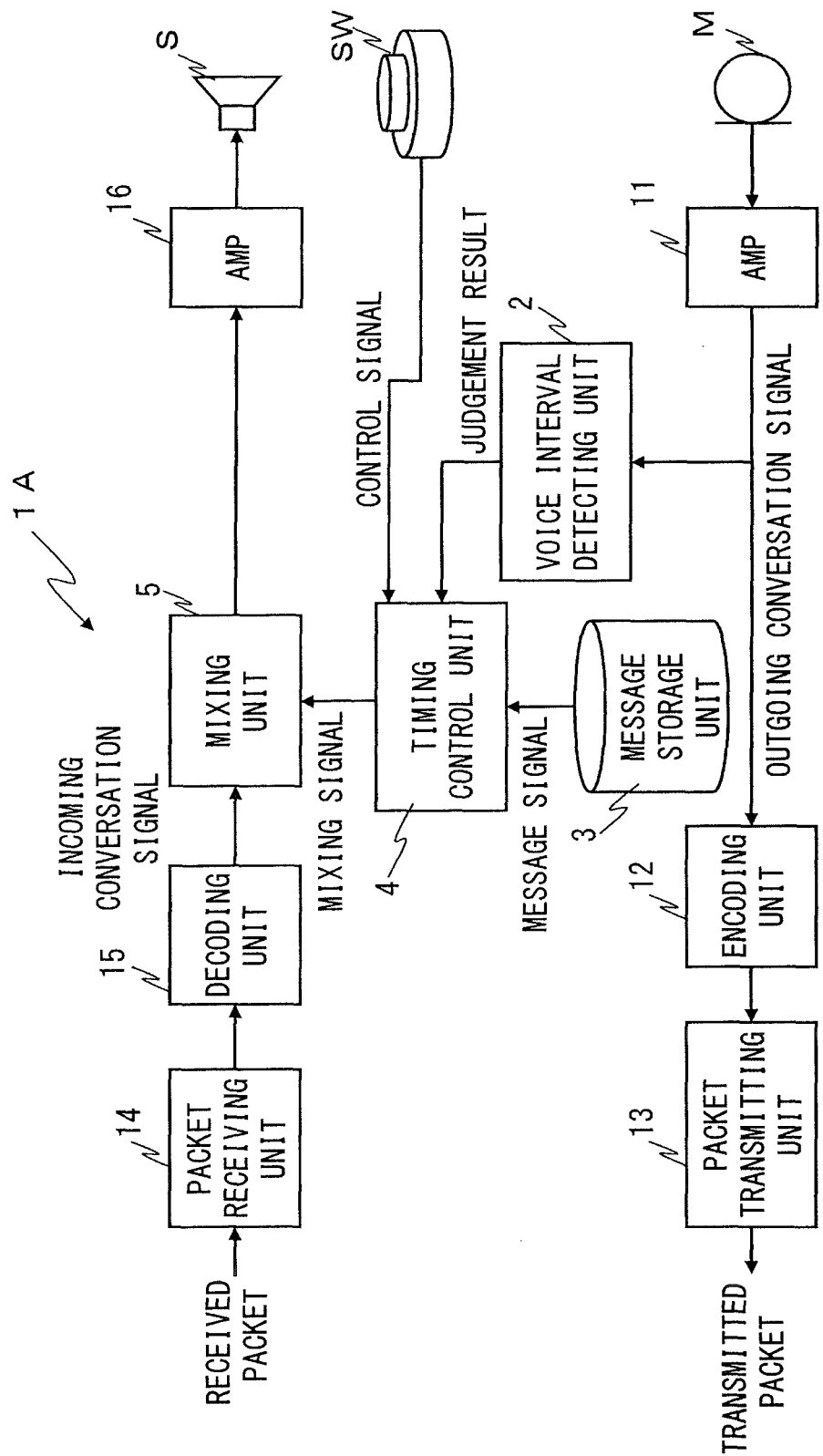
FIG. 4 illustrates a diagram illustrating an exemplary arrangement of a voice communication apparatus in a second embodiment.

FIG. 4 illustrates a diagram illustrating a voice communication apparatus 1A in the second embodiment.

With reference to FIG. 4, the voice communication apparatus 1A includes a voice interval detecting unit 2, a message storage unit 3, a timing control unit 4, and a mixing unit 5 in the same manner as in the first embodiment.

The voice communication apparatus 1A further includes, as an outgoing conversation unit, a microphone M, an amplifier (AMP) 11, an encoding unit 12, and a packet transmitting unit 13.

The microphone M collects utterances of a user of the voice communication apparatus 1A. The voice signal, which is input into the microphone M, is amplified by the amplifier 11, and the signal is input as the outgoing conversation signal into the encoding unit 12. The outgoing conversation signal, which is output from the amplifier 11, is also input into the voice interval detecting unit 2.

The encoding unit 12 performs the analog/digital conversion (A/D conversion) process and the encoding compression process for the outgoing conversation signal, and the voice encoded signal is given to the packet transmitting unit 13. The packet transmitting unit 13 generates a packet including the voice encoded signal, and the packet is output as the transmitted packet.

The transmitted packet is sent to the unillustrated network, and the transmitted packet is received by a terminal device (not illustrated) of another party in communication via the network. Another party in communication can listen to the voice of the user based on the transmitted packet received by the terminal device.

The voice communication apparatus 1A includes, as an incoming conversation unit, a packet receiving unit 14, a decoding unit 15, the mixing unit 5, an amplifier (AMP) 16, and a speaker S.

The packet, which is transmitted from the terminal device of another party in communication and which includes the voice signal of another party in communication, arrives at the voice communication apparatus 1A via the network, and the packet is received as the received packet by the packet receiving unit 14.

The packet receiving unit 14 extracts the voice encoded signal included in the received packet, and the signal is given to the decoding unit 15. The decoding unit performs the decoding process and the digital/analog conversion (D/A conversion) with respect to the voice encoded signal, and the obtained voice signal is output as the incoming conversation signal.

The incoming conversation signal is input into the mixing unit 5 and the signal is output, while being subjected to the mixing with the voice message, if necessary, and then signal is amplified by the amplifier 16, followed by being connected to the speaker 16. The speaker S outputs the voice on the basis of the incoming conversation signal supplied from the amplifier.

Accordingly, the user of the voice communication apparatus 1A can listen to the voice of another party in communication. Further, the user can also listen to the playback sound of the voice message subjected to the mixing, if necessary.

The voice communication apparatus 1A further includes a switch SW for allowing the user to input the mixing control signal into the timing control unit 4. The switch SW is one of input devices of the voice communication apparatus 1A (IP telephone). The user can start up the timing control unit 4 by turning ON the switch SW.

The amplifiers 11, 16, the encoding unit 12, the packet transmitting unit 13, the packet receiving unit 14, and the decoding unit 15 illustrated in FIG. 4 can be realized by using any exclusive or general purpose hardware. Alternatively, the encoding unit 12, the packet transmitting unit 13, the packet receiving unit 14, and the decoding unit 15 can be realized as the functions obtained such that a processor such as CPU or DSP executes the programs stored in a memory.

Figure 5:
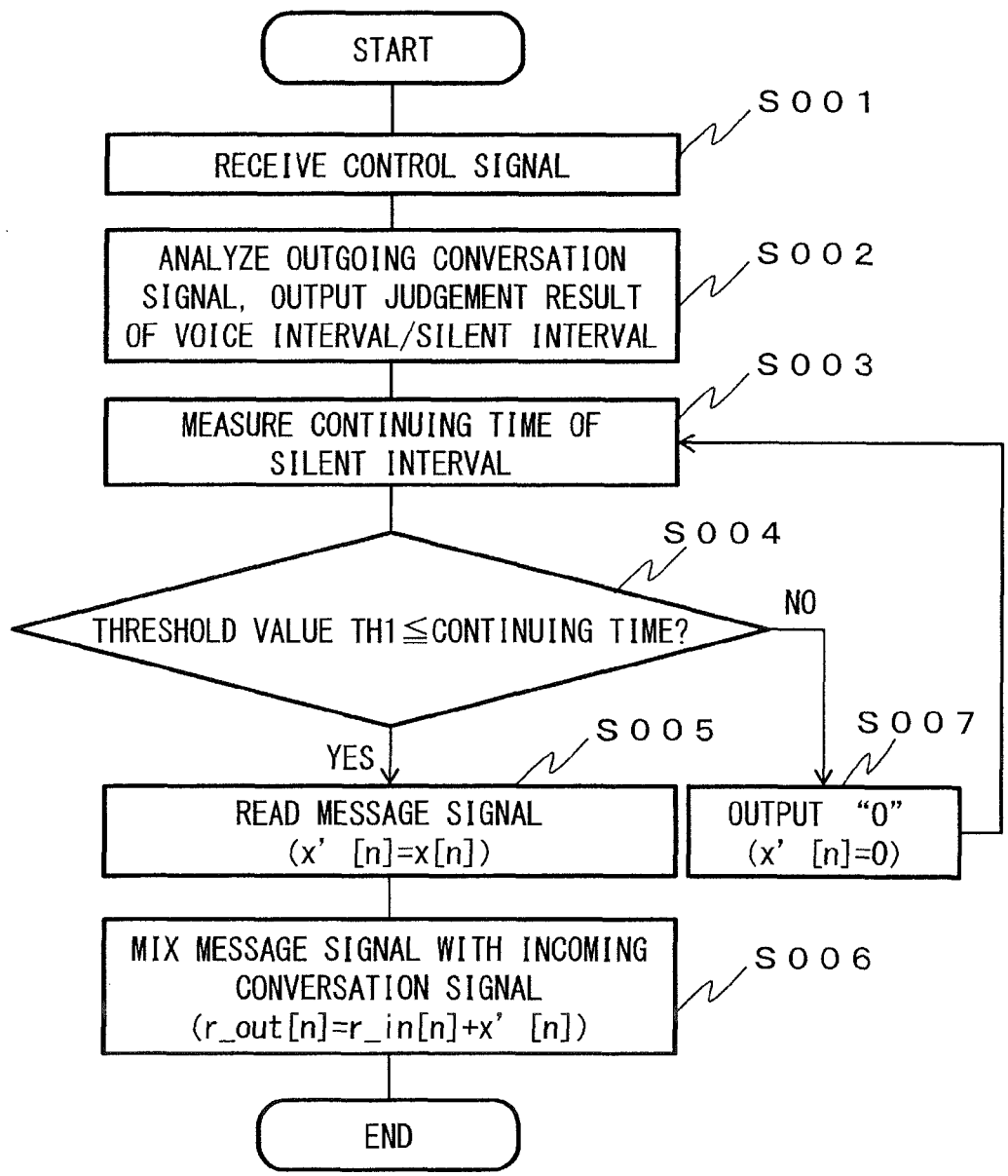
FIG. 5 illustrates a flow chart illustrating an exemplary operation of the voice communication apparatus in the second embodiment.

FIG. 5 illustrates a diagram illustrating an exemplary operation of the voice communication apparatus 1A in the second embodiment. The flow chart illustrated in FIG. 5 is started by receiving the control signal from the switch SW by the timing control unit 4 (Step S001).

The timing control unit 4, when receiving the control signal, gives, to the voice interval detecting unit 2, the instruction to start the judgment of the voice interval/silent interval of the outgoing conversation signal. Accordingly, the voice interval detecting unit 2 judges whether the interval is the voice interval or the silent interval for each of the frames by using, for example, the VAD (VAD: Voice Activity Detection) technique. And then, the voice interval detecting unit 2 outputs the judgment result of each of the frames to the timing control unit 4 (Step S002).

The timing control unit 4 receives the judgment result supplied from the voice interval detecting unit 2 to measure the continuing time of the silent interval (Step S003).

The timing control unit 4 judges whether or not the continuing time of the silent interval, i.e., the silent interval length is equal to or more than the predetermined threshold value TH1 (Step S004). In this procedure, if the continuing time is less than the threshold value TH1 (NO in S004), the process proceeds to Step S007.

On the other hand, if the continuing time is equal to or more than the threshold value TH1 (YES in S004), then the timing control unit 4 reads the voice message to be played back, i.e., the message signal x'[n] from the message storage unit 3, and the message signal x[n] is given as the mixing signal x'[n] to the mixing unit 5 (x'[n]=x[n], Step S005). Symbol "n" indicates the sample number of the frame.

The mixing unit 5 outputs the output signal r_out[n] in which the mixing signal x'[n], i.e., the message signal x[n] is subjected to the mixing with the incoming conversation signal r_in[n] from the decoding unit 15 (r_out[n]=r_in[n]+x'[n], Step S006). When the reading of the voice message is completed, the operation based on the flow chart illustrated in FIG. 5 is completed.

Accordingly, the voice message and the voice of another party in communication based on the incoming conversation signal are output from the speaker S. The user can listen to the voice message. The voice message can provide, to the user, the subject or topic of the conversation with another party in communication. Thus, the user can make a favorable conversation with another party in communication.

On the other hand, if the process proceeds to Step S007, the timing control unit 4 outputs "0" as the mixing signal (x'[n]=0). Accordingly, the output signal r_out[n] of the mixing unit 5 is the same as r_in[n]. That is, the voice message is not output.

The function and the effect of the second embodiment are approximately the same as those of the first embodiment. The mixing of the voice message is started if the continuing time of the silent time, i.e., the silent interval length is equal to or more than the threshold value TH1. Accordingly, the playback of the voice message can be started in the interval A (FIG. 1) in which the user does not utter. It is possible to secure the easy talking and the easy listening for the user.

In the second embodiment, the voice interval detecting unit 2 starts the judging operation to judge the voice interval/silent interval in accordance with the instruction from the timing control unit 4. In place of this construction, it is also allowable that the operation is started in accordance with the input of the mixing control signal from the switch SW.

[Third Embodiment]

Next, a voice communication apparatus of a third embodiment will be explained. The third embodiment has the common features common to those of the first and second embodiments. Therefore, an explanation will be principally made about different features, and the common features are omitted from the explanation.

Figure 6:
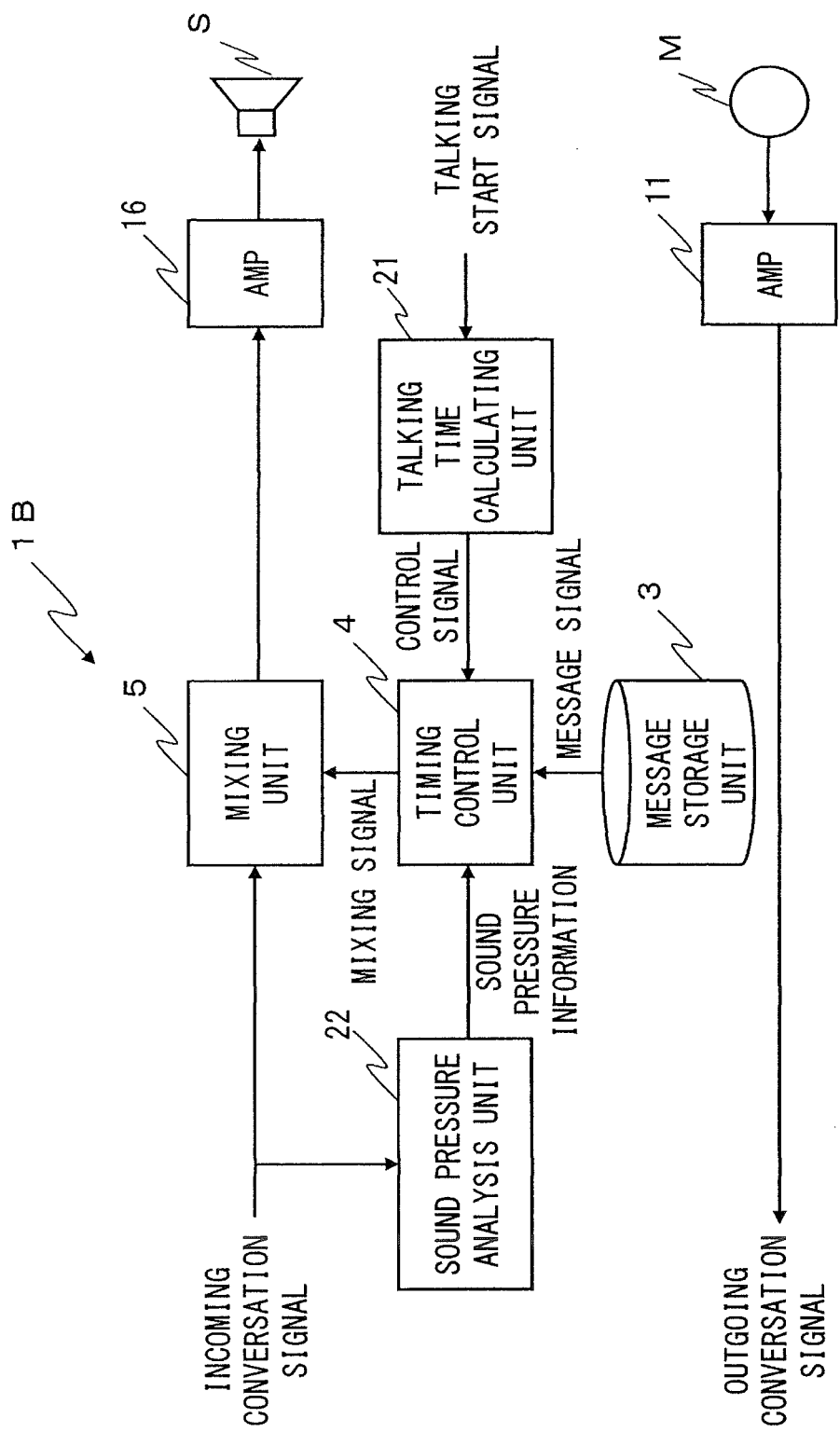
FIG. 6 illustrates a diagram illustrating an exemplary arrangement of a voice communication apparatus in a third embodiment.

FIG. 6 illustrates an exemplary arrangement of the voice communication apparatus 1B in the third embodiment. The voice communication apparatus 1B comprises a message storage unit 3, a timing control unit 4, and a mixing unit 5 in the same manner as in the first and second embodiments. An amplifier 16 and a speaker S are connected to the mixing unit 5 in the same manner as in the second embodiment.

On the other hand, a talking time calculating unit 21 and a sound pressure analysis unit 22 as the analysis unit are connected to the timing control unit 4. A talking start signal is input into the talking time calculating unit 21. The talking start signal is input, for example, when the communication line is established between the voice communication apparatus 1B and the terminal device of another party in communication.

The talking time calculating unit 21 has a timer for measuring the talking time. Every time when a predetermined period of time of the talking time elapses, the mixing control signal is input into the timing control unit 4. Accordingly, in the third embodiment, the timing control unit 4 is periodically started up every time when the predetermined time elapses.

On the other hand, the incoming conversation signal is input into the sound pressure analysis unit 22. The sound pressure analysis unit 22 analyzes the sound pressure of the incoming conversation signal. The sound pressure information, which is the analysis result, is input into the timing control unit 4. The sound pressure information includes the power for each of the frames of the incoming conversation signal.

The voice communication apparatus 1B includes a microphone M and an amplifier 11 in the same manner as in the second embodiment. It is possible to output the outgoing conversation signal. However, the voice interval detecting unit 2 is omitted from the voice communication apparatus 1B. The outgoing conversation signal is not used for the mixing control of the voice message.

The talking time calculating unit 21 and the sound pressure analysis unit 22 illustrated in FIG. 6 can be realized by using any exclusive or general purpose hardware. Alternatively, the talking time calculating unit 21 and the sound pressure analysis unit 22 can be realized as the functions obtained such that a processor such as CPU or DSP executes the programs stored in a memory.

Figure 7:
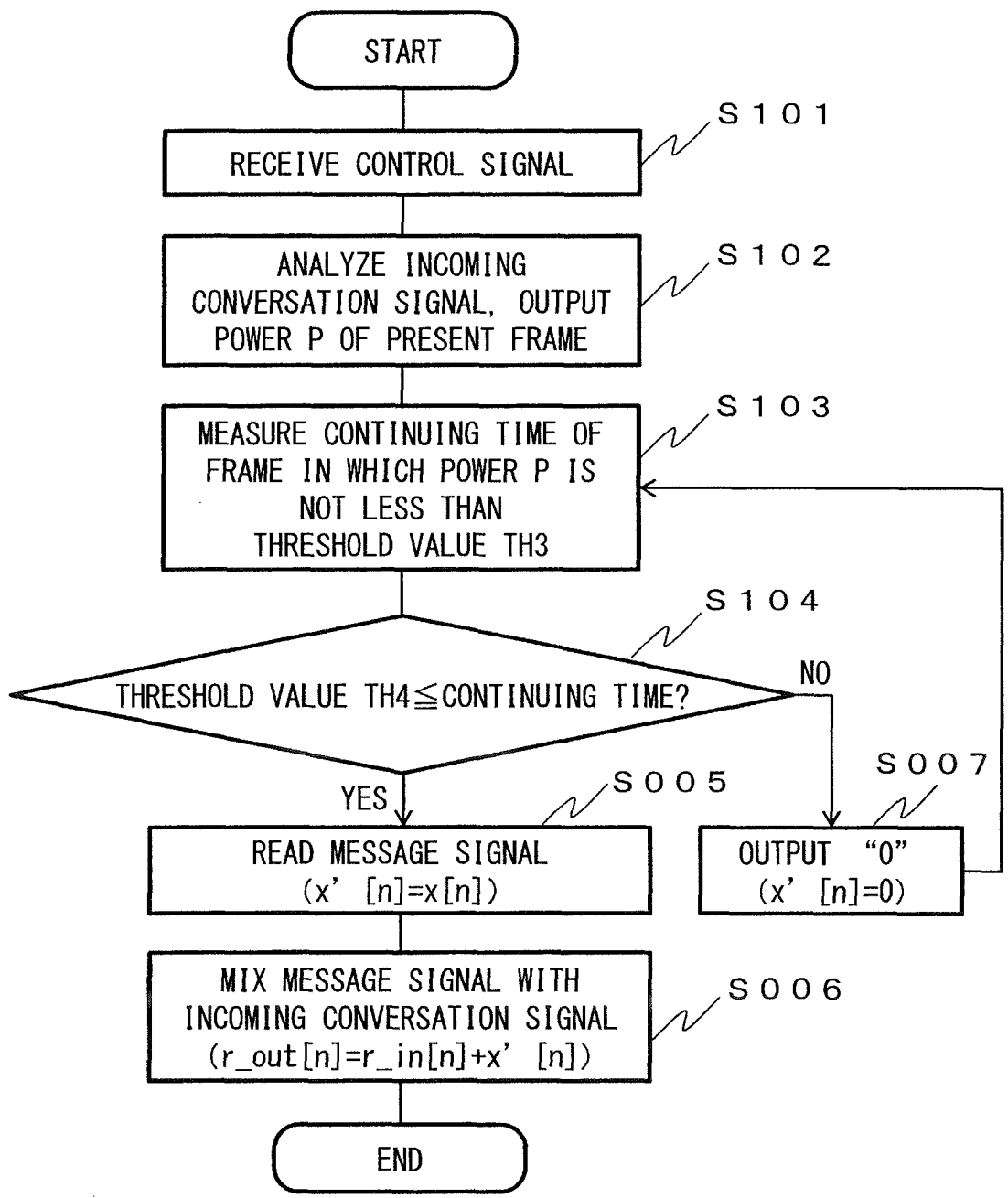
FIG. 7 illustrates a flow chart illustrating an exemplary operation of the voice communication apparatus in the third embodiment.

FIG. 7 illustrates a flow chart illustrating an exemplary operation of the voice communication apparatus 1B in the third embodiment. The flow chart illustrated in FIG. 7 is started by detecting, by the talking time calculating unit 12, the elapse of a predetermined time after the start of the talking on the phone and inputting the mixing control signal into the timing control unit 4 (Step S101).

The timing control unit 4, which receives the control signal, gives the startup instruction to the sound pressure analysis unit 22. Accordingly, the sound pressure analysis unit 22 analyzes the incoming conversation signal, and the sound pressure of the present frame, i.e., the power P is output to the timing control unit 4 (Step S102).

The power P can be calculated in accordance with the following expression (1).

[formula 1]

$$P = \frac{1}{N} \sum_{i=0}^{N-1} s\_in[i] \quad (1)$$

In the expression, N represents the total number of samples in 1 frame.

The timing control unit 4 receives the power P for each of the frames from the sound pressure analysis unit 22, and the timing control unit 4 measures the continuing time for the frame in which the power P of the frame is equal to or more than a threshold value TH3 previously held by the timing control unit 4 (Step S103).

The timing control unit 4 judges whether or not the continuing time is equal to or more than a threshold value TH4 previously held by the timing control unit 4 at the point in time at which the power P of the present frame is less than the threshold value TH3 (Step S104). In this procedure, if the continuing time is less than the threshold value TH4 (NO in S104), the process proceeds to Step S007.

On the other hand, if the continuing time is equal to or more than the threshold value TH4 (YES in S104), the process proceeds to Step S005. The processes in Steps S005 to S007 illustrated in FIG. 7 are the same as or equivalent to those of the second embodiment.

That is, if the continuing time is equal to or more than the threshold value TH4, the mixing of the voice message is started. Accordingly, the voice message and the voice of another party in communication based on the incoming conversation signal are output from the speaker S in the same manner as in the second embodiment. The user can listen to the voice message. If the continuing time is less than the threshold value TH4, the mixing of the voice message is not performed.

In the third embodiment, the talking time calculating unit 21 is provided in place of the switch SW. The control signal is input into the timing control unit 4 every time when the predetermined time elapses after the start of the talking on the phone. Accordingly, it is possible to periodically generate the timing of the mixing control of the voice message.

Further, the timing control unit 4 can read the different voice message from the message storage unit 3 in every period. Accordingly, new subjects or topics can be provided as the voice messages as the conversation continues.

The state, in which the sound pressure of the incoming conversation signal, i.e., the power P is equal to or more than the threshold value TH3 as described above, means that the incoming conversation signal includes the utterance of another party in communication. Usually, the user does not utter during the period in which the user hears the voice from another party in communication. Therefore, the mixing of the voice message, i.e., the playback thereof can be started in the interval A (FIG. 1) in which the user does not utter.

In the third embodiment, the sound pressure analysis unit 22 starts the judging operation for judging the voice interval/silent interval in accordance with the instruction from the timing control unit 4. In place of this construction, it is also allowable that the mixing control signal is input into both of the timing control unit 4 and the sound pressure analysis unit 22 and the both start the operations.

[Fourth Embodiment]

Next, a voice communication apparatus of a fourth embodiment will be explained. The fourth embodiment has the common features common to those of the first, second, and third embodiments. Therefore, an explanation will be principally made about different features, and the common features are omitted from the explanation.

Figure 8:
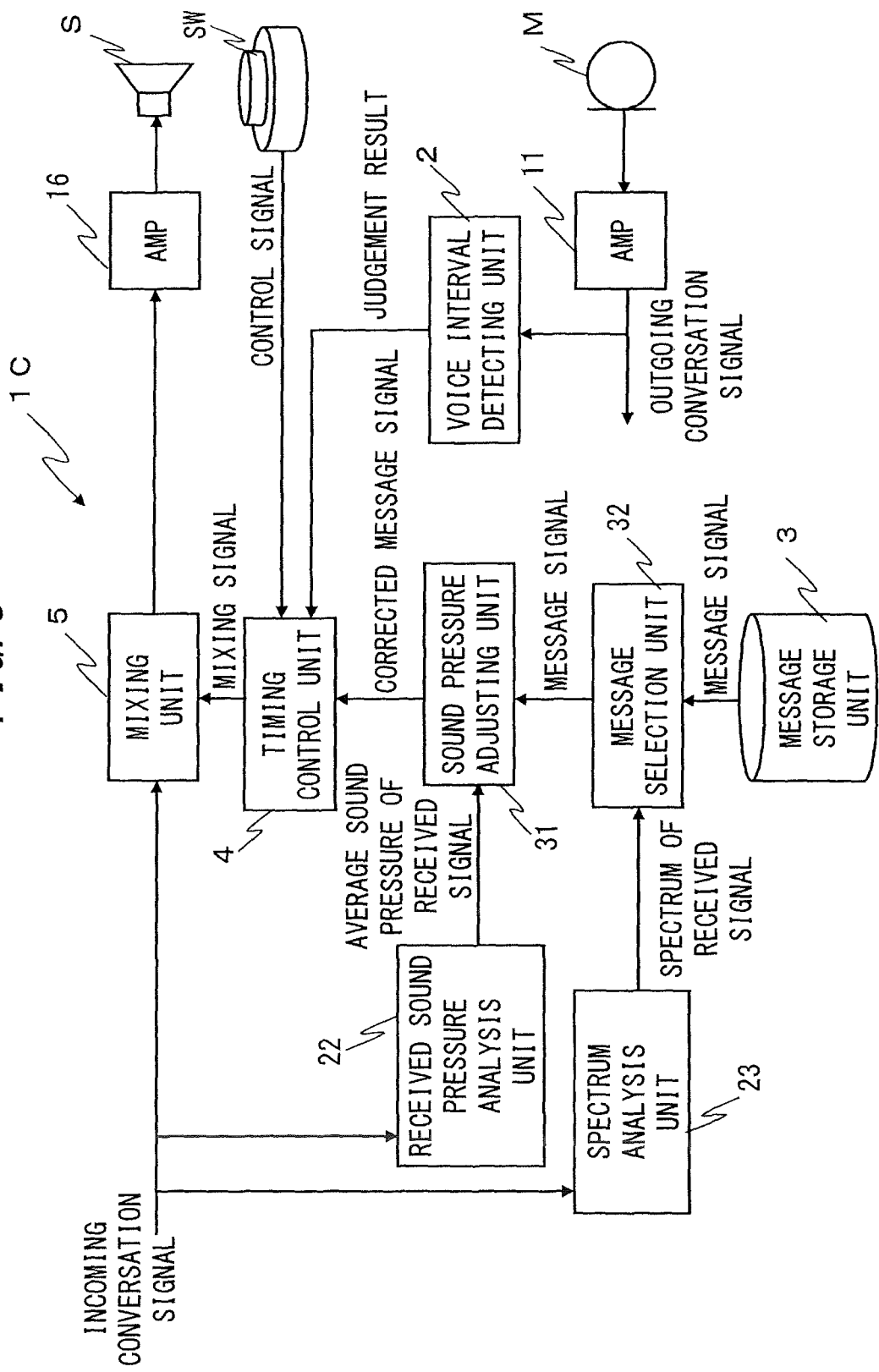
FIG. 8 illustrates a diagram illustrating an exemplary arrangement of a voice communication apparatus in a fourth embodiment.

FIG. 8 illustrates a diagram illustrating an exemplary arrangement of the voice communication apparatus 1C in the fourth embodiment. The voice communication apparatus 1C includes a voice interval detecting unit 2, a message storage unit 3, a timing control unit 4, and a mixing unit 5 in the same manner as in the first and second embodiments. An amplifier 16 and a speaker S are connected to the mixing unit 5 in the same manner as in the second and third embodiments.

Further, the voice communication apparatus 1C includes a microphone M and an amplifier 11 in the same manner as in the second embodiment. The outgoing conversation signal, which is output from the amplifier 11, is input into the voice interval detecting unit 2.

Further, the voice communication apparatus 1C includes a sound pressure analysis unit 22 in the same manner as in the third embodiment. However, the voice communication apparatus 1C includes a sound pressure adjusting unit 31 which is provided as the adjusting unit, a message selection unit 32 which is provided as the selection unit, and a spectrum analysis unit 33 which is provided as the voice quality analysis unit, as constitutive elements different from those of the first to third embodiments.

The incoming conversation signal is input into the spectrum analysis unit 33. The spectrum analysis unit 33 performs the spectrum analysis for the incoming conversation signal, and the spectrum analysis result of the incoming conversation signal, i.e., the frequency characteristic is input as the analysis result into the message selection unit 32.

The message selection unit 32 reads the voice message, i.e., the message signal corresponding to the analysis result of the spectrum analysis unit, and the signal is given to the sound pressure adjusting unit 31. A plurality of voice messages (message signals), which have the same content but which have different frequency spectrums (frequency characteristics), are previously stored in the message storage unit 3.

The sound pressure adjusting unit 31 receives the average sound pressure of the incoming conversation signal output from the sound pressure analysis unit 22. The sound pressure adjusting unit 31 corrects the sound pressure of the message signal (voice message) depending on the average sound pressure, and inputs the corrected message signal into the timing control unit 4.

The timing control unit 4 gives the corrected message signal as the mixing signal to the mixing unit 5, if the silent interval length is equal to or more than the threshold value TH1 on the basis of the judgment result of the voice interval detecting unit to judge whether the interval is the voice interval or the silent interval, in the same manner as in the second embodiment.

The sound pressure adjusting unit 31, the message selection unit 32, and the spectrum analysis unit 33 illustrated in FIG. 8 can be realized by using any exclusive or general purpose hardware. Alternatively, the sound pressure adjusting unit 31, the message selection unit 32, and the spectrum analysis unit 33 can be realized as the functions obtained such that a processor such as CPU or DSP executes the programs stored in a memory.

Figure 9:
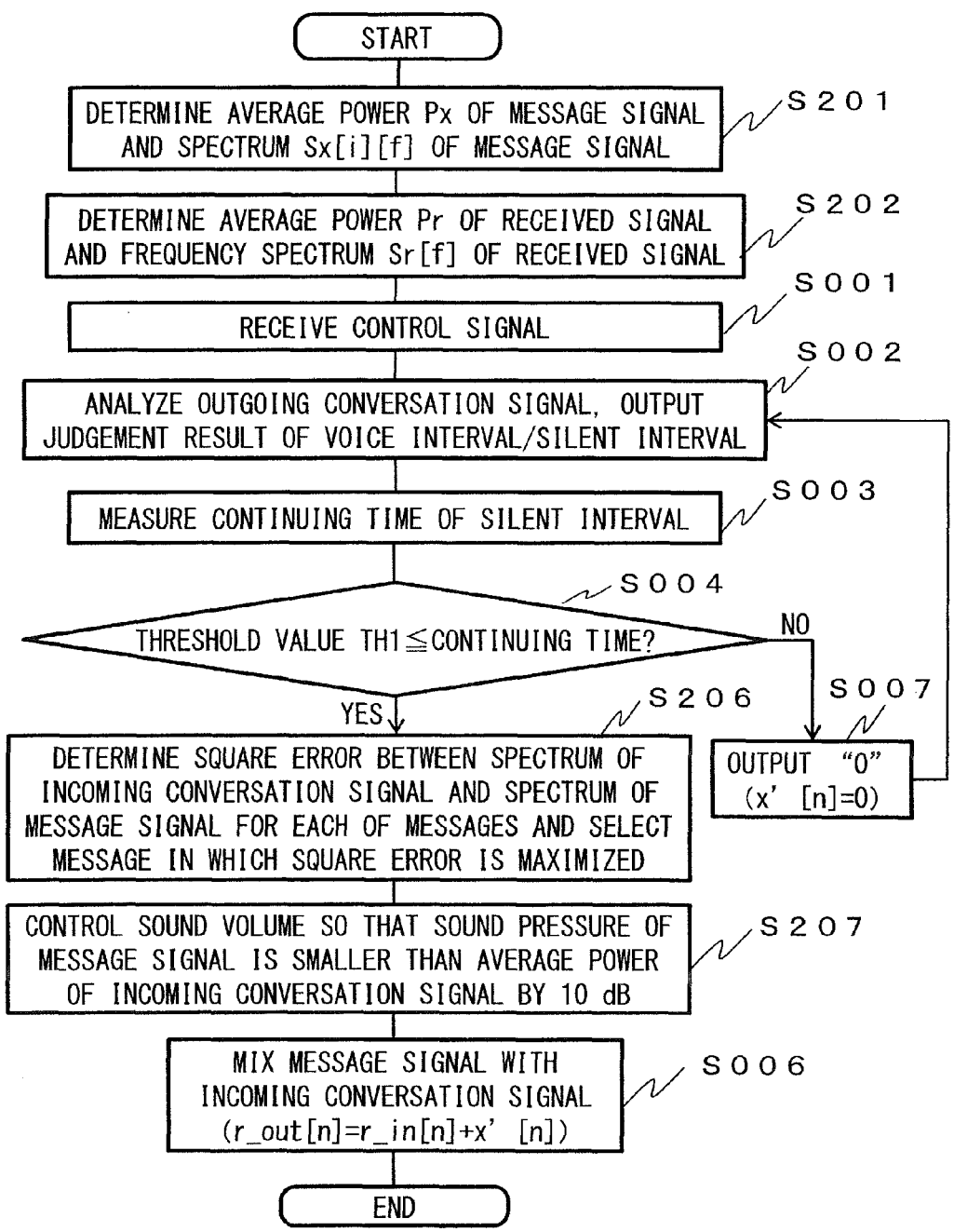
FIG. 9 illustrates a flow chart illustrating an exemplary operation of the voice communication apparatus in the fourth embodiment.

FIG. 9 illustrates a flow chart illustrating an exemplary operation of the voice communication apparatus 1C in the fourth embodiment.

As the preprocessing of the voice communication apparatus 1C, the average power Px and the frequency spectrum Sx[i] [f] of a plurality of message signals previously stored in the message storage unit 3 are determined beforehand (Step S201). Symbol [i] described above is the identifier of the message signal, and symbol "f" indicates the frequency. The value of the average power Px may be previously held by the sound pressure adjusting unit 31. Further, the value of the frequency spectrum Sx[i] [f] may be previously held by the message selection unit 32. Alternatively, the values of the average power Px and the frequency spectrum Sx[i] [f] may be previously held by the timing control unit 4, and the values may be given to the sound pressure adjusting unit 31 and the message selection unit 32, if necessary. In this case, it is possible to omit Step S201.

As the preprocessing, the sound pressure analysis unit 22 determines the average power Pr of the incoming conversation signal, and the average power Pr is input into the sound pressure adjusting unit 31, irrelevant to the presence or absence of the control signal. On the other hand, the spectrum analysis unit 23 performs the fast Fourier transform (FFT) with respect to the incoming conversation signal, analyzes the frequency spectrum of the incoming conversation signal, determines the frequency spectrum Sr[f] of the incoming conversation signal, and gives the frequency spectrum Sr[f] to the message selection unit 32 (Step S202).

On the precondition of Steps S201 and S202, the processes or the operations of Steps S001 to S004 illustrated in FIG. 9 are performed. The processes of Steps S001 to S004 are the same as or equivalent to those of the second embodiment (FIG. 5), any explanation of which is omitted. The operation of Step S007 illustrated in FIG. 9 is also the same as or equivalent to that of the second embodiment.

If the continuing time is equal to or more than the threshold value TH1 in Step S004, then the timing control unit 4 starts the reading of the message signal in Step S206, and the message selection instruction is given to the message selection unit 32. The message selection unit 32 reads a plurality of message signals as selection candidates from the message storage unit 3. The message selection unit 32 determines the square error d[i] between the frequency spectrum Sr[f] of the incoming conversation signal and the frequency spectrum Sx[i] [f] of the message signal for each of the messages to select the message signal in which the square error d[i] is minimized.

The square error d[i] can be calculated in accordance with the following expression (2).

[formula 2]

$$d[i] = \sum_{f=0}^{L-1} |S_r[f]|^2 - |S_x[i][f]|^2 \qquad (2)$$

In the expression, "i" represents the message number, "f" represents the frequency, and "L" represents the upper limit of the frequency.

The message signal x'[i] [n], which is selected by the message selection unit 32, is given to the sound pressure adjusting unit 31.

The sound pressure adjusting unit 31 controls the sound volume of the message signal so that the sound pressure of the message signal is smaller by a predetermined value than the average power Px of the incoming conversation signal. The predetermined value is, for example, 5 to 15 dB and preferably 10 dB.

The corrected message signal x" can be determined in accordance with the following expressions (3) and (4).

$$x''[n] = \text{gain} \times x'[i][n] \qquad (3)$$

[formula 3]

$$\text{gain} = 10^{((P_r - 10) - P_x)/20} \qquad (4)$$

After that, the timing control unit 4 gives the corrected message signal to the mixing control unit 5 in the same manner as in the second embodiment, and the mixing process is performed by the mixing control unit 5 (S006).

In the fourth embodiment, it is possible to obtain the function and the effect which are the same as or equivalent to those of the second embodiment. Further, according to the fourth embodiment, the plurality of voice messages (message signals), which have the same content but which have the different frequency spectrums as the parameters for indicating the voice qualities, are previously stored in the message storage unit 3, and one of the plurality of message signals, which has the frequency most different from the frequency of the incoming conversation signal, is selected. Further, the sound pressure is adjusted so that the sound volume of the selected message signal is smaller than the sound volume of the incoming conversation signal.

Accordingly, the voice message, which has the voice quality that is most different from that of the voice of the incoming conversation signal, is played back as the voice having the sound volume smaller than that of the voice of the incoming conversation signal, i.e., the voice of another party in communication. For example, it is possible to adopt the following procedure. That is, if another party in communication is a woman, a male voice message is played back. If another party in communication is a man, a female voice message is played back. Accordingly, the voice message can be heard with ease.

[Fifth Embodiment]

Next, a voice communication apparatus of a fifth embodiment will be explained. The fifth embodiment has the common features common to those of the third embodiment. Therefore, an explanation will be principally made about different features, and the common features are omitted from the explanation.

Figure 10:
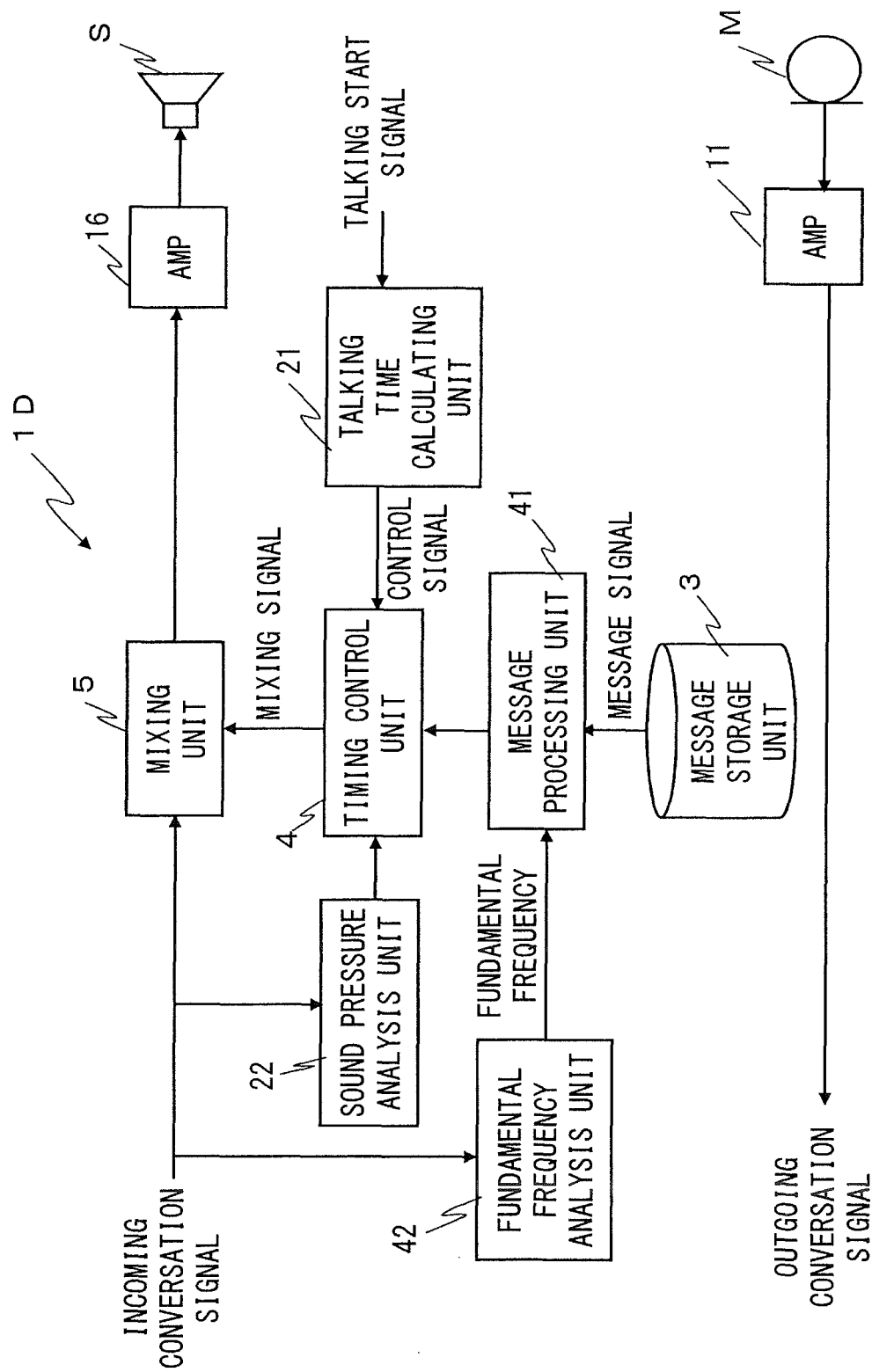
FIG. 10 illustrates a diagram illustrating an exemplary arrangement of a voice communication apparatus in a fifth embodiment.

FIG. 10 illustrates a diagram illustrating an exemplary arrangement of the voice communication apparatus 1D of the fifth embodiment. The voice communication apparatus 1D includes a message storage unit 3, a timing control unit 4, a mixing unit 5, a talking time calculating unit 21, and a sound pressure analysis unit 22 in the same manner as in the third embodiment. Further, the voice communication apparatus 1D includes a microphone M, amplifiers 11, 16, and a speaker S.

On the other hand, the voice communication apparatus 1D includes a message processing unit 41 which is provided as the changing unit and a fundamental frequency analysis unit 42. The incoming conversation signal is input into the fundamental frequency analysis unit 42. The fundamental frequency analysis unit 42 analyzes the incoming conversation signal to determine the fundamental frequency (pitch frequency) of the incoming conversation signal which is given to the message processing unit 41. The message processing unit 41 adjusts the fundamental frequency of the message signal so that the fundamental frequency of the message signal (voice message) read from the message storage unit 3 is far from the fundamental frequency of the incoming conversation signal on the basis of the fundamental frequency of the incoming conversation signal, and the result is given to the timing control unit 4.

The message processing unit 41 and the fundamental frequency analysis unit 42 illustrated in FIG. 10 can be realized by using any exclusive or general purpose hardware. Alternatively, the message processing unit 41 and the fundamental frequency analysis unit 42 can be realized as the functions obtained such that a processor such as CPU or DSP executes the programs stored in a memory.

Figure 11:
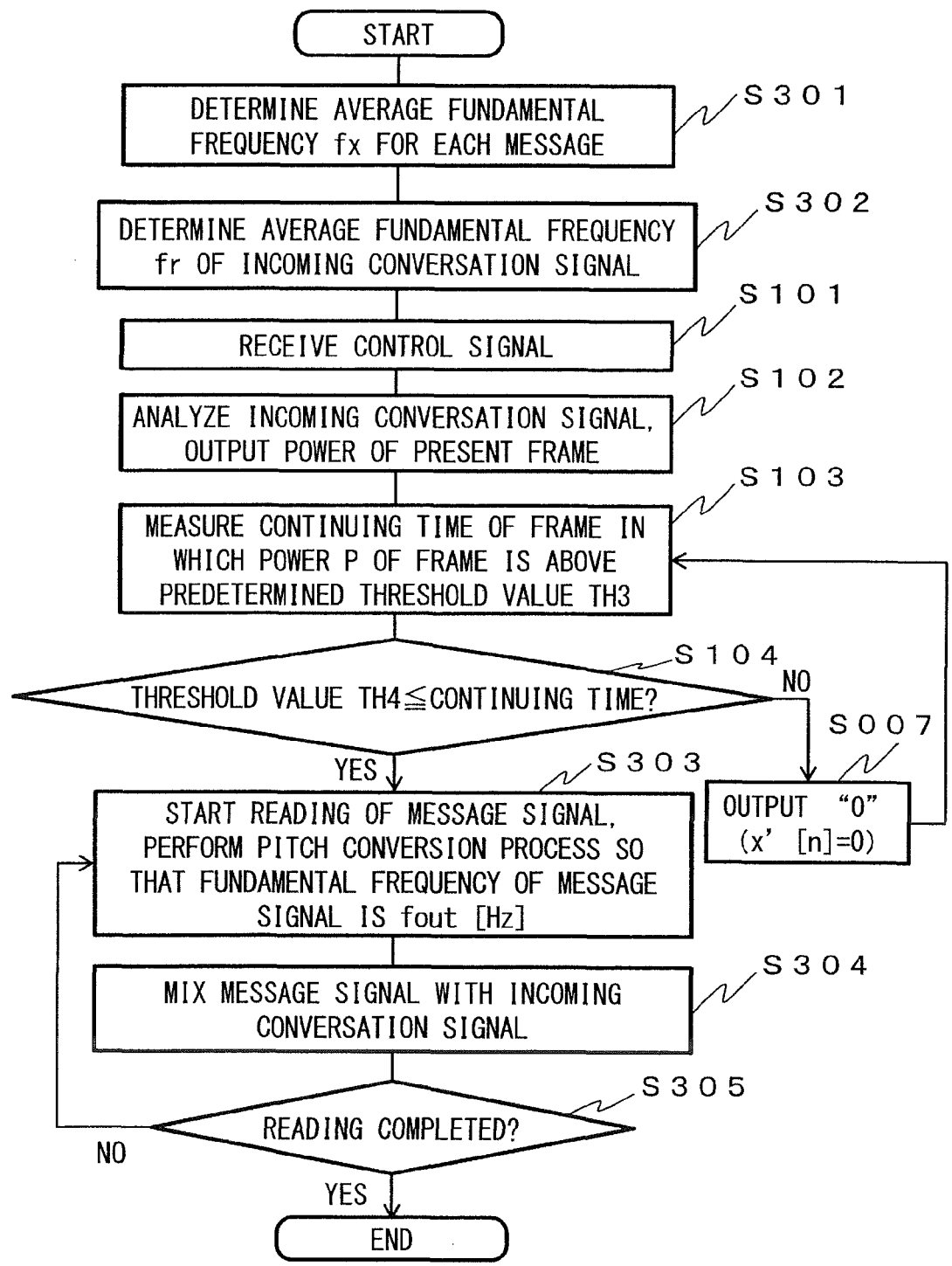
FIG. 11 illustrates a flow chart illustrating an exemplary operation of the voice communication apparatus in the fifth embodiment.

FIG. 11 illustrates a flow chart illustrating an exemplary operation of the voice communication apparatus 1D of the fifth embodiment.

As the precondition for the process illustrated in FIG. 11, the average fundamental frequency fx for each of the messages stored in the message storage unit 3 is previously determined (Step S301). However, the value of the average fundamental frequency fx may be previously held by the message processing unit 41. Alternatively, the value of the average fundamental frequency fx may be previously held by the timing control unit 4, and the value may be given to the message processing unit 41, if necessary. In this case, it is possible to omit Step S301.

As the precondition for the process, the fundamental frequency analysis unit 42 determines the average fundamental frequency fr of the incoming conversation signal irrelevant to the presence or absence of the mixing control signal and inputs the average fundamental frequency fr into the message processing unit 41 (Step S302).

The processes of Steps S101 to S104 and S007 illustrated in FIG. 11 are the same as those in the second embodiment, any explanation of which is omitted. If the power P of the frame of equal to or more than the threshold value TH3 is continued for equal to or more than the threshold value TH4 in Step S104, the process proceeds to Step S303.

In Step S303, the timing control unit 4 starts the reading of the message signal, and the reading instruction is given to the message processing unit 41. The message processing unit 41 reads the message signal from the message storage unit 3, and the pitch conversion process is performed so that the fundamental frequency of the message signal is a predetermined output frequency fout [Hz].

FIG. 12 illustrates an explanatory diagram of the pitch conversion process. The output frequency fout has two predetermined values of flow and fhigh. If the fundamental frequency fx of the message signal read from the message storage unit 3 is above the average fundamental frequency fr of the incoming conversation signal, flow is selected as fout. On the other hand, if the fundamental frequency fx is equal to or lower than the average fundamental frequency fr of the incoming conversation signal, fhigh is selected as fout. The process as described above is executed for each of the frames.

The message signal, to which the pitch conversion process is applied, is given to the timing control unit 4. The message signal, to which the pitch conversion process is applied, is given as the mixing signal by the timing control unit 4 to the mixing unit 5. The mixing unit 5 performs the mixing of the incoming conversation signal with the message signal in the same manner as in the third embodiment.

After that, the mixing process is continuously performed until the reading of the message signal from the message storage unit 3 is completed and the signal is given to the mixing unit 5 (Step S305).

According to the fifth embodiment, the function and the effect, which are the same as or equivalent to those of the third embodiment, are obtained. Further, if the fundamental frequency of the incoming conversation signal is higher than the fundamental frequency of the message signal, the fundamental frequency of the message signal is made higher than that of the incoming conversation signal. If the fundamental frequency of the incoming conversation signal is equal to or lower than the fundamental frequency of the message signal, the fundamental frequency of the message signal is made lower than that of the incoming conversation signal. Accordingly, it is possible to play back the voice message in which the fundamental frequency (pitch of voice) is greatly different from the pitch of voice of another party in communication.

Therefore, the voice message can be heard with ease. The constructions of the embodiments explained above can be appropriately combined with each other.

According to the embodiments described above, the voice message can be played back at a proper timing during talking on a phone.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A voice communication apparatus comprising:
   an analysis unit to analyze an outgoing conversation signal transmitted from a user of the voice communication apparatus to another party in communication or an incoming conversation signal from the another party in communication received by the voice communication apparatus;
   a storage unit to store a voice message to be played back;
   a mixing unit to perform mixing of the voice message with the incoming conversation signal; and
   a control unit to control a start timing of the mixing so that the mixing of the voice message with the incoming conversation signal is started between utterances of the user on the basis of an analysis result of the analysis unit,
   wherein the analysis unit outputs a sound pressure in every unit time of the incoming conversation signal; and
   the control unit starts the mixing when an interval, in which the sound pressure of the incoming conversation signal is equal to or more than a predetermined threshold value, is continued for a predetermined time.

2. The voice communication apparatus according to claim 1, wherein the analysis unit outputs a judgment result of whether an interval is a voice interval or a silent interval in every unit time of the outgoing conversation signal; and
   the control unit starts the mixing when a silent interval length is equal to or more than a predetermined threshold value.

3. The voice communication apparatus according to claim 1, wherein the storage unit stores a plurality of voice messages which have the same content and which have different voice characteristic amounts, and the voice communication apparatus further comprises:
   a characteristic amount analysis unit to determine a voice characteristic amount of the incoming conversation signal; and
   a selection unit to compare the voice characteristic amount of the incoming conversation signal with the voice characteristic amounts of the plurality of voice messages and to select, as a mixing object, the voice message having the voice characteristic amount which is most different from the voice characteristic amount of the incoming conversation signal.

4. The voice communication apparatus according to claim 1, further comprising:
   a characteristic amount analysis unit to determine a voice characteristic amount of the incoming conversation signal; and
   a changing unit to change a voice characteristic amount of the voice message so that a difference between the voice characteristic amount of the voice message stored in the storage unit and the voice characteristic amount of the incoming conversation signal is increased.

5. The voice communication apparatus according to claim 1, further comprising:
   an adjusting unit to make a sound pressure of the voice message smaller than a sound pressure of the incoming conversation signal.

6. A voice message mixing method comprising:
   analyzing an outgoing conversation signal transmitted from a user of a voice communication apparatus to another party in communication or an incoming conversation signal from the another party in communication received by the voice communication apparatus;
   performing mixing of a voice message with the incoming conversation signal;
   determining a start timing of the mixing so that the mixing of the voice message with the incoming conversation signal is started between utterances of the user on the basis of a result of the analysis; and
   performing the mixing of the voice message with the incoming conversation signal at the start timing,
   wherein the analyzing outputs a sound pressure in every unit time of the incoming conversation signal; and
   the mixing is started when an interval, in which the sound pressure of the incoming conversation signal is equal to or more than a predetermined threshold value, is continued for a predetermined time.

* * * * *